US009316850B2

(12) United States Patent
Cho et al.

(10) Patent No.: US 9,316,850 B2
(45) Date of Patent: Apr. 19, 2016

(54) REWORKING APPARATUS FOR DISPLAY MODULE AND REWORKING METHOD FOR DISPLAY MODULE USING THE SAME

(71) Applicant: SAMSUNG DISPLAY CO., LTD., Yongin, Gyeonggi-Do (KR)

(72) Inventors: Jong Hwan Cho, Ansan-Si (KR); Hyeon Deuk Hwang, Cheonan-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 137 days.

(21) Appl. No.: 14/159,379

(22) Filed: Jan. 20, 2014

(65) Prior Publication Data
US 2015/0024651 A1 Jan. 22, 2015

(30) Foreign Application Priority Data
Jul. 19, 2013 (KR) .................. 10-2013-0085594

(51) Int. Cl.
*G02F 1/13* (2006.01)
*H05B 33/10* (2006.01)
*G02F 1/1333* (2006.01)

(52) U.S. Cl.
CPC .............. *G02F 1/1309* (2013.01); *H05B 33/10* (2013.01); *G02F 2001/133331* (2013.01); *G02F 2202/28* (2013.01)

(58) Field of Classification Search
CPC ................ G02F 2001/133331; G02F 1/1309; G02F 2202/28; H05B 33/10
See application file for complete search history.

(56) References Cited

U.S. PATENT DOCUMENTS

2012/0165465 A1   6/2012   Kim et al.

FOREIGN PATENT DOCUMENTS

| KR | 10-2006-0119067 | 11/2006 |
| KR | 10-2010-0115529 | 10/2010 |
| KR | 10-2012-0072163 | 7/2012 |

*Primary Examiner* — Mary Ellen Bowman
(74) *Attorney, Agent, or Firm* — F. Chau & Associates, LLC

(57) ABSTRACT

A reworking apparatus for a display module includes a chamber and a temperature control unit. The temperature control unit controls a temperature in the chamber to reduce an adhesive property of an adhesive material of the display module. The adhesive material couples a first layer of the display module to a second layer of the display module. A stage is disposed in the chamber and holds the display module. A separation unit is disposed in the chamber and is inserted in between first and second layers of the display module. A movement unit moves the separation unit.

28 Claims, 13 Drawing Sheets

REWORKING APPARATUS FOR DISPLAY MODULE AND REWORKING METHOD FOR DISPLAY MODULE USING THE SAME

CROSS-REFERENCE TO RELATED APPLICATION

This U.S. non-provisional patent application claims priority under 35 U.S.C. §119 to Korean Patent Application No. 10-2013-0085594, filed on Jul. 19, 2013, the disclosure of which is incorporated by reference herein in its entirety.

TECHNICAL FIELD

The present disclosure relates to a reworking apparatus, and more particularly to a reworking apparatus for a display module and a reworking method of the display module using the same.

DISCUSSION OF RELATED ART

In general, a display module is configured to include a display panel, a touch panel, a polarizing plate, and a cover window. The components are coupled to each other by an adhesive material. An optically clear resin or an optically clear adhesive may be used as the adhesive material. When a component in which defects occur is found after the components of the display module are coupled to each other, a reworking process is performed to replace the defective component with a new one.

In general, the reworking process is manually performed. To separate the defective component from the other components, a physical force is applied to the defective component, but the physical force may also be applied to the other components in which no defects have occurred. As a result, the non-defective components may be damaged, and a success rate of reworking the display module may be decreased.

SUMMARY

The present disclosure provides a reworking apparatus capable of increasing a success rate of reworking a display module.

The present disclosure provides a reworking method for the display module using the reworking apparatus.

Exemplary embodiments of the present invention provide a reworking apparatus of a display module, which includes a chamber and a temperature control unit. The temperature control unit controls a temperature in the chamber to reduce an adhesive property of the adhesive material of the display module. The adhesive material couples a first layer of the display module to a second layer of the display module disposed on the first layer. A stage is disposed in the chamber and holds the display module. A separation unit is disposed in the chamber and inserted in between the first layer and the second layer. A movement unit is connected to the separation unit to move the separation unit inserted in between the first layer and the second layer to separate the second layer from the first layer.

According to an exemplary embodiment of the present invention, the temperature control unit may maintain the temperature in the chamber at a desired temperature in a range of about −60° C. to about −40° C.

According to an exemplary embodiment of the present invention, the temperature control unit may maintain the temperature in the chamber at a desired temperature in a range of about −40° C. to about 100° C.

According to an exemplary embodiment of the present invention, the separation unit may include a separation knife having a quadrangular pyramid shape. The separation knife may include a bottom surface substantially vertical to a first direction into which the separation unit is inserted and a plurality of side surfaces extended in the first direction.

According to an exemplary embodiment of the present invention, multiple separation knives may be provided. The multiple separation knives may be arranged in a second direction substantially perpendicular to the first direction and spaced apart from each other at regular intervals.

According to an exemplary embodiment of the present invention, the separation unit may further include a separation frame extended substantially in parallel to the separation knife. The separation frame may be inserted in between the first layer and the second layer through a gap. The separation frame may support the second layer. The gap may be formed between the first layer and the second layer by the separation knife. The movement unit may move the separation frame to a third direction substantially vertical to an upper surface of the stage to separate the second layer from the first layer.

According to an exemplary embodiment of the present invention, the separation frame may include a first separation frame and a second separation frame. The first and second separation frames may be disposed at opposite sides of the separation knife and may be arranged in the second direction to be spaced apart from each other by a predetermined distance.

According to an exemplary embodiment of the present invention, the separation frame may have a thickness smaller than the gap.

According to an exemplary embodiment of the present invention, the separation knife may have a thickness in a range from about 1 mm to about 100 mm.

According to an exemplary embodiment of the present invention, an angle between an upper surface and a lower surface among the side surfaces of the separation knife may be in a range of about 1 degree to about 60 degrees.

According to an exemplary embodiment of the present invention, the reworking apparatus may further include a fixing part disposed adjacent to the display module to secure the display module while the first and second layers are separated from each other.

According to an exemplary embodiment of the present invention, the first layer may be a polarizing layer and the second layer may be a cover window.

According to an exemplary embodiment of the present invention, the display module may include a touch panel and a polarizing layer, which are sequentially stacked. The first layer may be an uppermost layer of the touch panel, which faces the polarizing layer, and the second layer may be the polarizing layer facing the first layer.

According to an exemplary embodiment of the present invention, the display module may include a display panel and a touch panel, which are sequentially stacked. The first layer may be an uppermost layer of the display panel, which faces the touch panel. The second layer may be a lowermost layer of the touch panel, which faces the uppermost layer of the display panel.

According to an exemplary embodiment of the present invention, the display module may be a display module for an organic light emitting display or a display module for a liquid crystal display.

According to an exemplary embodiment of the present invention, the display module may include a flexible display panel.

According to an exemplary embodiment of the present invention, the display module includes a curved display panel which contains at least one bend.

According to an exemplary embodiment of the present invention, the stage may further include a vacuum absorbing pad to secure the display module.

Exemplary embodiments of the present invention provide a reworking method of a display module including fixing a display module to a stage. The display module includes a first layer and a second layer disposed on the first layer and coupled to the first layer using an adhesive material. The method includes controlling a process temperature to decrease an adhesive property of the adhesive material. The method includes inserting a separation unit in between the first layer and the second layer, and moving the separation unit inserted in between the first layer and the second layer to separate the second layer from the first layer.

According to an exemplary embodiment of the present invention, the process temperature may be maintained in a range at a predetermined temperature from about −60° C. to about 100° C.

According to an exemplary embodiment of the present invention, the separation of the second layer may include moving the separation unit in a direction substantially vertical to an upper surface of the stage.

According to an exemplary embodiment of the present invention, the method further includes moving the separation unit in a direction substantially in parallel to an upper surface of the stage after the inserting of the separation unit.

According to an exemplary embodiment of the present invention, the separation unit may include a first separation unit and a second separation unit. The inserting of the separation unit may further include aligning the first and second separation units on an imaginary line that passes through a center portion of the stage and extended in a first direction, into which the separation unit is inserted. The first and second separation units may move along the imaginary line and may be substantially simultaneously inserted in between the first layer and the second layer.

According to an exemplary embodiment of the present invention, the separation unit may further include a separation knife and a separation frame. The inserting of the separation unit may include inserting the separation knife in between the first layer and the second layer and inserting the separation frame in between the first layer and the second layer after the separation knife is inserted in between the first layer and the second layer. The separation of the second layer from the first layer may include moving the separation frame inserted in between the first layer and the second layer.

According to the above, the reworking process may be performed after the adhesive property of the adhesive material is reduced. The display module may be prevented from being damaged and the success rate in reworking of the display module may be increased.

BRIEF DESCRIPTION OF THE DRAWINGS

The above and other features of the present invention will become more apparent by describing in detail exemplary embodiments thereof, with reference to the accompanying drawings in which.

DETAILED DESCRIPTION

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers may refer to like elements.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, exemplary embodiments of the present invention will be explained in detail with reference to the accompanying drawings.

Figure 1:
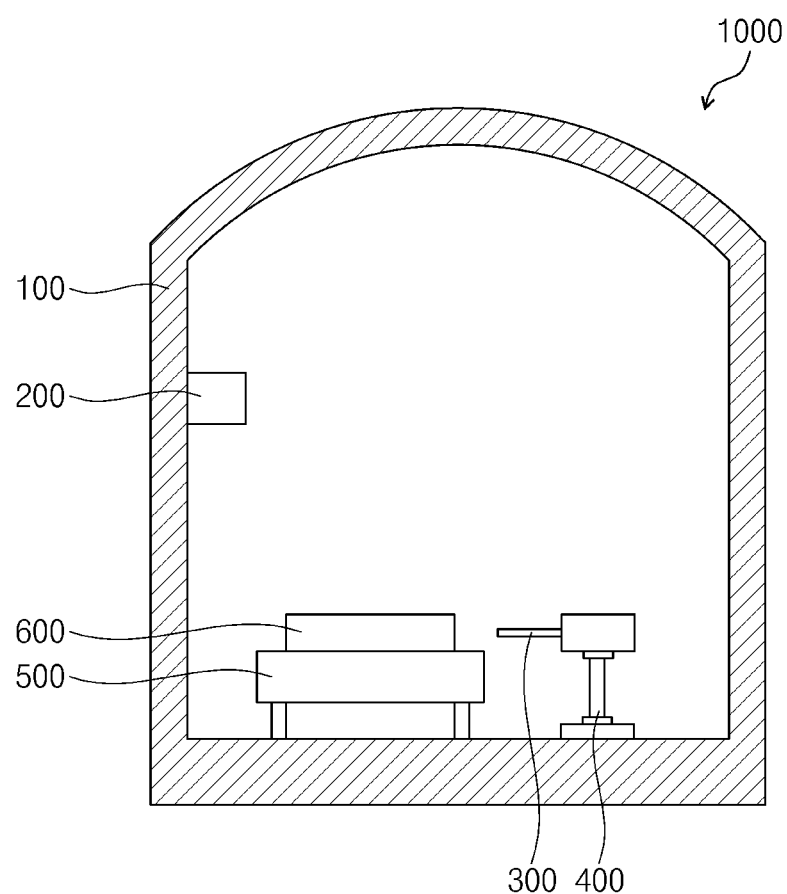
FIG. 1 is a cross-sectional view showing a reworking apparatus according to an exemplary embodiment of the present invention.

FIG. 1 is a cross-sectional view showing a reworking apparatus according to an exemplary embodiment of the present invention.

Referring to FIG. 1, the reworking apparatus 1000 includes a chamber 100, a temperature control unit 200, a separation unit 300, a movement unit 400, and a stage 500.

The chamber 100 may be sealed. The sealed chamber 100 may control a temperature therein. The temperature inside the chamber 100 may be set to a desired temperature by the temperature control unit 200. The chamber 100 has a predetermined volume, and the temperature control unit 200, the separation unit 300, the movement unit 400, and the stage 500 may be disposed inside the chamber 100. The chamber 100 may include an entrance through which a display module 600 is input or output.

The temperature control unit 200 may be disposed in the chamber 100 and may automatically maintain the temperature in the chamber 100 at the desired temperature. The temperature of the chamber 100 may be controlled by the temperature control unit 200 to reduce the adhesive property of an adhesive material 700 (refer to, e.g., FIG. 3). Therefore, the inside of the chamber 100 may be maintained at a low or high temperature according to the adhesive material 700. For example, when the adhesive property of the adhesive material 700 used for the display module 600 is lowered by maintaining a temperature in a range from about −60° C. to about −40° C. during the reworking process, the temperature of the chamber 100 may be maintained in a range from about −60° C. to about −40° C. by the temperature control unit 200. For example, when the adhesive property of the adhesive material 700 used for the display module 600 is lowered by maintain a temperature in a range from about −40° C. to about 100° C. during the reworking process, the temperature of the chamber 100 may be maintained in a range from about −40° C. to about 100° C. by the temperature control unit 200.

The stage 500 may be disposed at a lower portion of the chamber 100 and the display module 600 may be fixed to an upper surface of the stage 500.

The separation unit 300 is connected with the movement unit 400 disposed adjacent to the display module 600. The movement unit 400 may be controlled by a control unit (not shown).

Figure 2:
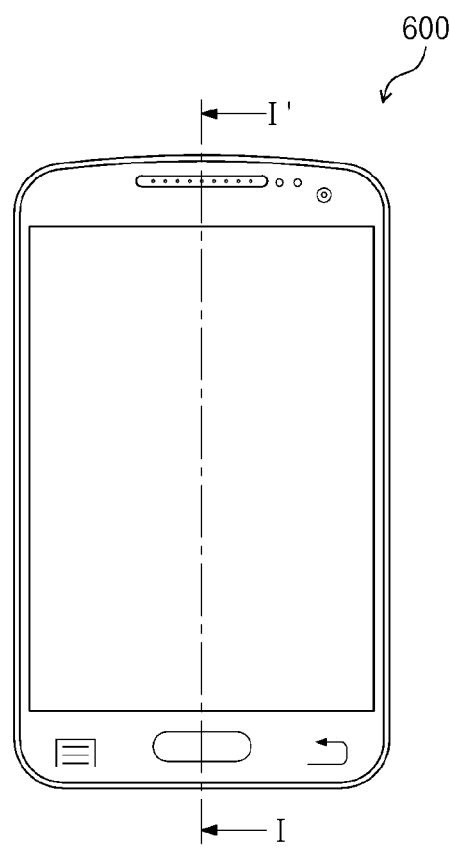
FIG. 2 is a plan view showing a display module shown in FIG. 1.
Figure 3:
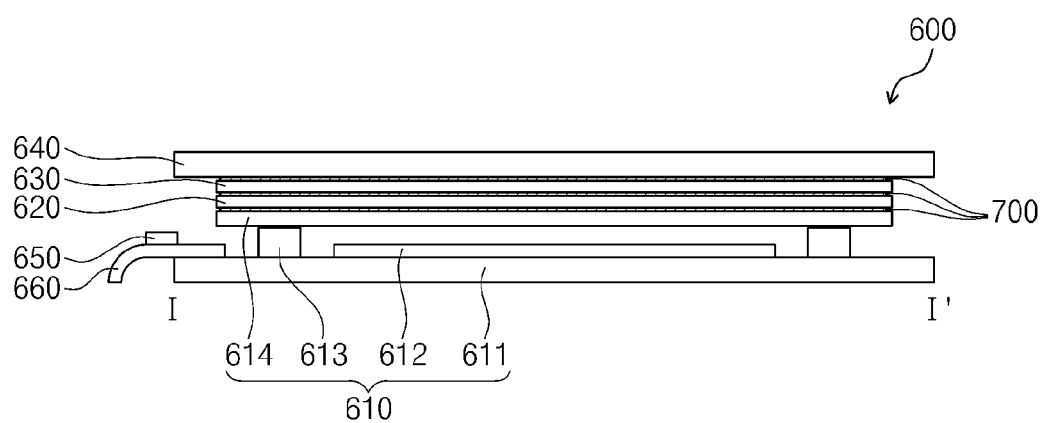
FIG. 3 is a cross-sectional view taken along a line I-I' of FIG. 2.

FIG. 2 is a plan view showing a display module shown in FIG. 1 and FIG. 3 is a cross-sectional view taken along a line I-I' of FIG. 2.

Referring to FIGS. 2 and 3, the display module 600 may include a display panel 610, a touch panel 620, a polarizing layer 630, a cover window 640, and the adhesive material 700. In exemplary embodiments of the present invention, the display panel 610 may be, but is not limited to, an organic light emitting display panel including an organic light emitting device. For example, the display module 600 may be applied to an organic light emitting display device. Although not shown in figures, the display panel 610 may be, for example, a liquid crystal display panel including a liquid crystal layer or an electrophoretic display panel including an electrophoretic layer.

The touch panel 620, the polarizing layer 630, and the cover window 640 may be sequentially disposed on the display panel 610, but the configuration of the display module 600 is not limited thereto or thereby. For example, one or more elements among the touch panel 620, the polarizing layer 630, and the cover window 640 may be disposed on the display panel 610.

Each of the display panel 610, the touch panel 620, the polarizing layer 630, and the cover window 640 may be coupled to adjacent element(s) thereto by using, for example, the adhesive material 700. The adhesive material 700 may be provided between an upper surface of the display panel 610 and a lower surface of the touch panel 620, between an upper surface of the touch panel 620 and a lower surface of the polarizing layer 630, and/or between an upper surface of the polarizing layer 630 and a lower surface of the cover window 640, for example.

The adhesive material 700 may include an optical clear resin or an optical clear adhesive. For example, the optical clear adhesive may have an adhesive property that is reduced at a relatively low temperature. The optical clear adhesive, which may have a T-peel strength of about 18.7(N/25 mm) at a room temperature, may have a T-peel strength of about 0.4(N/25 mm) measured at 40° C., for example. When the reworking process is performed while the temperature of the chamber 100 is set to about −40° C., for example, the adhesive property of the optical clear adhesive is lowered, and thus the reworking process may be sufficiently performed even though no large physical force is applied to the display module 600. Therefore, the success rate of the reworking process may be increased without causing damage to the display module 600.

The display panel 610 may include a first substrate 611, a device-forming layer 612, a sealant 613, and/or a sealing layer 614. The sealing layer 614 may be disposed on the first substrate 611. The device-forming layer 612 may be disposed between the first substrate 611 and the sealing layer 614.

The sealant 613 may be disposed between the first substrate 611 and the sealing layer 614 to surround the device-forming layer 612. A space between the sealing layer 614 and the first substrate 611 may be sealed by the sealant 613, and the sealed space may be filled with nitrogen gas. The sealing layer 614 may be formed of glass, but the invention is not limited thereto or thereby. For example, the sealing layer 614 may be configured to include a plurality of thin film layers of organic and/or inorganic material(s).

Plural wirings (not shown), at least one transistor (not shown), and an organic light emitting device (not shown), which may be electrically connected to each other, may be disposed on the device-forming layer 612. The wirings may be connected to the transistor to apply signals to the transistor. The transistor may be connected to the light emitting device to control a light emission of the organic light emitting device. A tape carrier package 660 on which an integrated circuit 650 may be mounted may be disposed on the first substrate 611 to correspond to an area not surrounded by the sealant 613, but the invention is not limited thereto or thereby. For example, the integrated circuit 650 may be mounted on the first substrate 611 in a chip on glass scheme to correspond to the area not surrounded by the sealant 613. The integrated circuit 650 may be electrically connected to the wirings to apply a scan signal and a data signal to the transistor.

The touch panel 620 may be disposed on the sealing layer 614. The touch panel 620 can be classified into a resistive film type touch panel and a capacitive type touch panel depending on its operation principle. The touch panel 620 may convert a physical input applied thereto by a user to an electrical signal and apply the electrical signal to the display part.

The polarizing layer 630 may be disposed on the touch panel 620. An external light incident to the display module 600 may be polarized by the polarizing layer 630 and the polarized light may be reflected by the device-forming layer 630. The reflected light is retarded in phase, and thus the reflected light does not pass through the polarizing layer 630. The cover window may be disposed on the polarizing plate 630.

Figure 4:
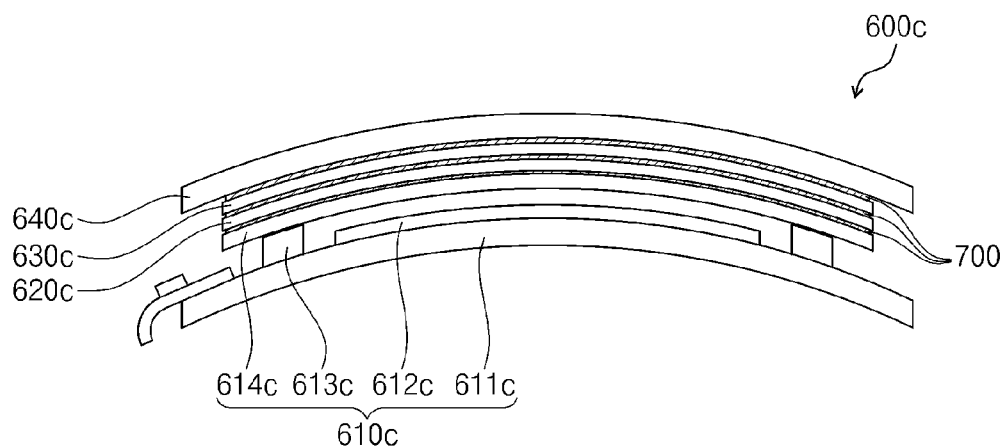
FIG. 4 is a cross-sectional view showing a display module including a curved display panel according to an exemplary embodiment of the present invention.

FIG. 4 is a cross-sectional view showing a display module including a curved display panel according to an exemplary embodiment of the present invention.

Referring to FIG. 4, the display module 600c has a curved shape. The display module 600c may include a curved display panel 610c, a touch panel 620c, a polarizing layer 630c, and/or a cover window 640c. The touch panel 620c, the polarizing layer 630c, and the cover window 640c may be sequentially disposed on the curved display panel 610c, but the configuration of the display module 600c are not limited thereto or thereby. For example, one or more elements among the touch panel 620c, the polarizing layer 630c, and the cover window 640c may be disposed on the display panel 610c. Each of the display panel 610c, the touch panel 620c, the polarizing layer 630c, and the cover window 640c may be coupled to adjacent element(s) thereto by using the adhesive material 700. The adhesive material 700 may be provided between an upper surface of the display panel 610c and a lower surface of the touch panel 620c, between an upper surface of the touch panel 620c and a lower surface of the polarizing layer 630c, and between an upper surface of the polarizing layer 630c and a lower surface of the cover window 640c, for example.

The curved display panel 610c has a curved shape, and the touch panel 620c, the polarizing layer 630c, and the cover window 640c disposed on the curved display panel 610c may have the same curved shape as the curved display panel 610c. The curved surface of the curved display panel 610c may have a predetermined radius of curvature of about 20R(mm) to about 1000R(mm).

Figure 5:
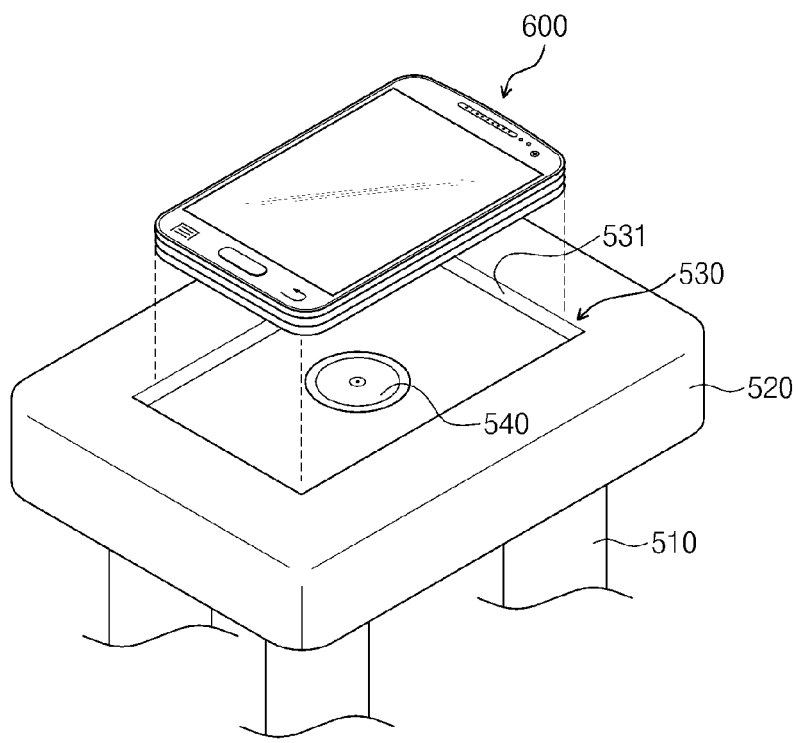
FIG. 5 is an exploded perspective view showing a stage and a display module shown in FIG. 1.

FIG. 5 is an exploded perspective view showing the stage and the display module shown in FIG. 1.

Referring to FIG. 5, the stage 500 may include a support part 510, an upper plate 520, and a jig part 530. The support part 510 may be connected with a lower surface of the upper plate 520 and may support the upper plate 520 to allow the upper plate 520 to be disposed at a position spaced apart from an inner lower surface of the chamber 100. The jig part 530 may be disposed on the upper surface of the upper plate 520. The jig part 530 may be provided with a recess 531 having a size corresponding to a size of the display module 600. The display module 600 may be positioned in the recess 531 and fixed to the stage 500. A vacuum absorbing pad 540 may be disposed on a lower surface of the recess 531. The vacuum absorbing pad 540 may be connected to a pump (not shown). The vacuum absorbing pad 540 may form at least a partial vacuum space between the vacuum absorbing pad 540 and the lower surface of the display module 600 by using the pump. Accordingly, the display module 600 may be fixed to the stage 500.

Figure 6:
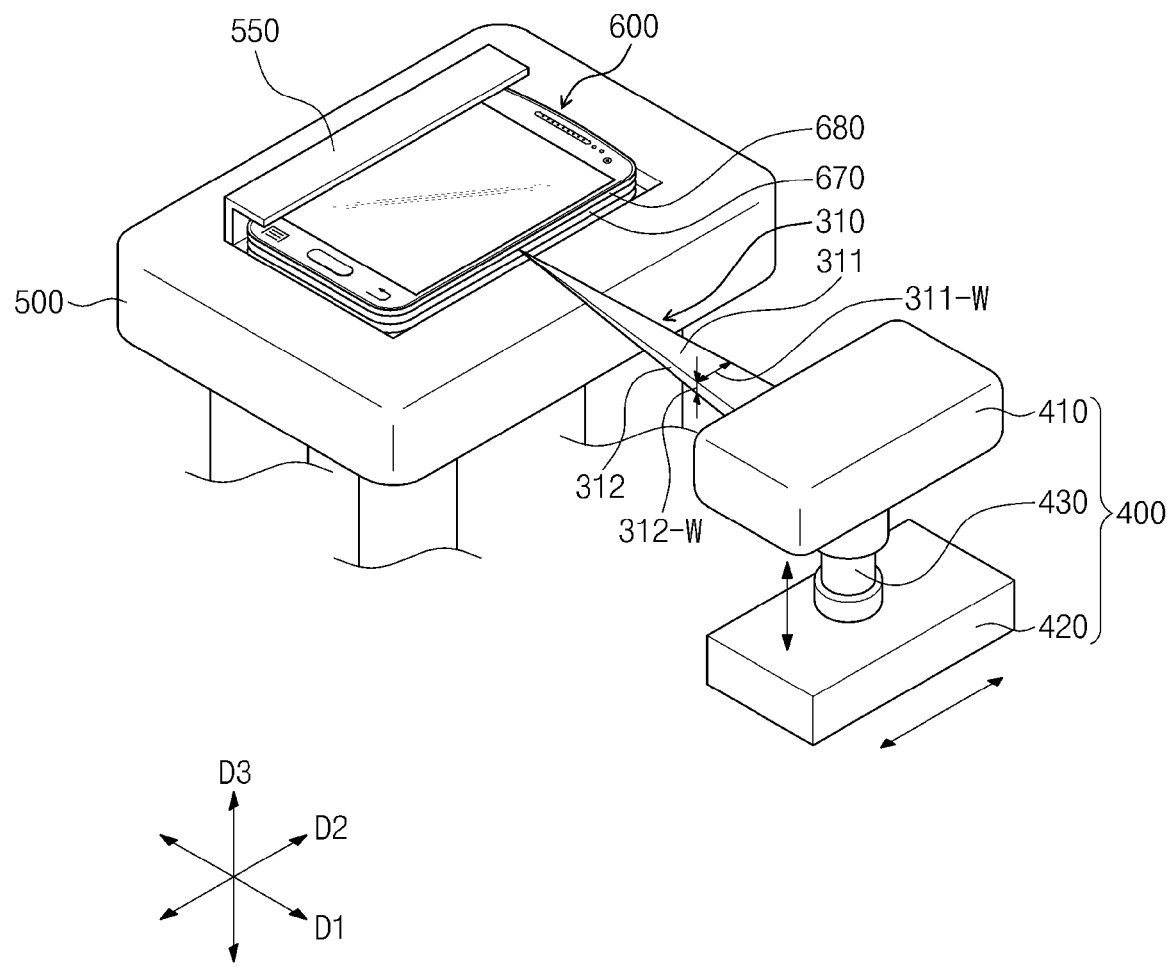
FIG. 6 is an enlarged perspective view of a stage, a movement unit, and a separation unit shown in FIG. 1.
Figure 7A:
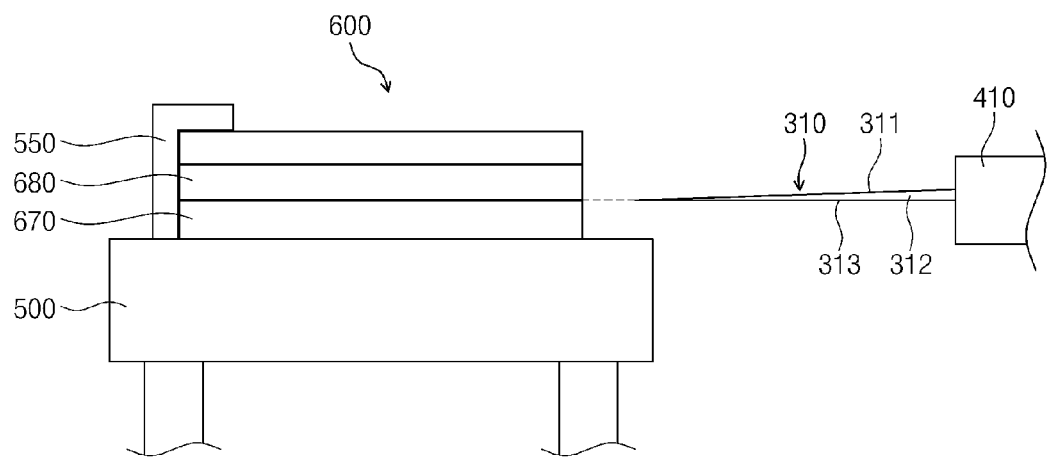
FIGS. 7A and 7B are side views showing a separating process of first and second layers by using a separation knife according to exemplary embodiments of the present invention.
Figure 7B:
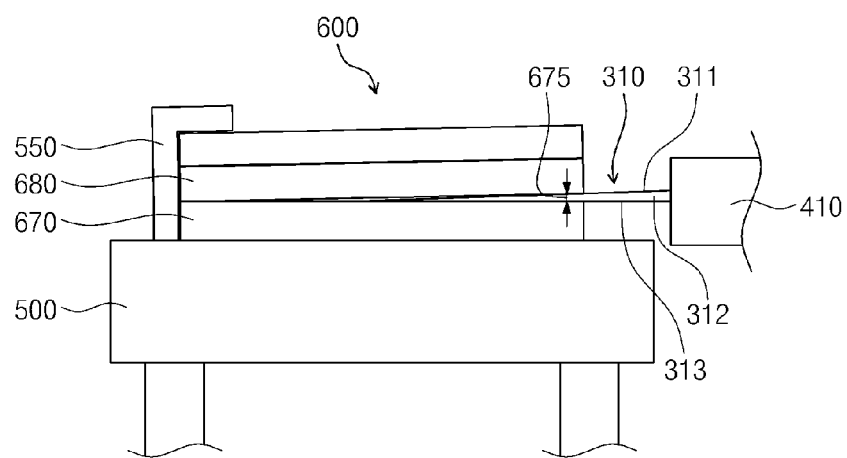

FIG. 6 is an enlarged perspective view of the stage, the movement unit, and the separation unit shown in FIG. 1 and FIGS. 7A and 7B are side views showing a separating process of first and second layers by using the separation knife.

Referring to FIG. 6, the separation unit 300 includes the separation knife 310. The movement unit 400 may move the separation knife 310 such that the separation knife 310 is inserted in between the first layer 670 and the second layer 680 of the display module 600. The movement unit 400 may include an insertion movement unit 410, a horizontal movement unit 420, and a vertical movement unit 430. The horizontal movement unit 420 may be disposed on the inner lower surface of the chamber. The vertical movement unit 430 may be connected to the horizontal movement unit 420 and the insertion movement unit 410. The separation knife 310 may be coupled to the insertion movement unit 410 at a surface of the insertion movement unit 410, which faces the stage 500. The insertion movement unit 410 moves the separation knife 310 in a first direction D1 by which the separation knife 310 may be inserted between the first layer 670 and the second layer 680 of the display module 600. For example, the separation knife 310 may be recessed in the insertion movement unit 410. The separation knife may move in the first direction D1. The horizontal movement unit 420 may move the vertical movement unit 430 in a second direction D2 substantially perpendicular to the first direction D1 on a flat surface including the upper surface of the stage 500, for example. The vertical movement unit 430 may move the insertion movement unit 410 in a third direction D3 substantially perpendicular to the first direction D1 and the second direction D2. The vertical movement unit 430 may control the movement thereof in a range from tens micrometers to hundreds of micrometers, for example. The movement of the separation knife 310 may be precisely controlled, thereby precisely inserting the separation knife 310 in between the first layer 670 and the second layer 680 of the display module 600. However, the configuration of the movement unit 400 is not limited thereto or thereby. The movement unit 400 has a configuration sufficient to move the separation unit 300 in the first, second, and third directions D1, D2, and D3. The movement unit 400 may be automatically controlled by a controller (not shown) such that the display module 600 is not damaged.

The first layer 670 and the second layer 680 may be, for example, the polarizing layer 630 and the cover window 640, respectively. According to an exemplary embodiment of the present invention, when the display module includes the touch panel 620 and the polarizing layer 630, which are sequentially stacked, the first layer 670 may be an uppermost layer of the touch panel 620, which faces the polarizing layer 630, and the second layer 680 may be the polarizing layer 630. According to an exemplary embodiment of the present invention, when the display module includes the display panel 610 and the touch panel 620, which are sequentially stacked, the first layer 670 may be an uppermost layer of the display panel 610, which faces the touch panel 620, and the second layer 680 may be a lowermost layer of the touch panel 620, which faces the uppermost layer of the display panel 610.

Referring to FIGS. 6, 7A, and 7B, the separation knife 310 may be disposed adjacent to the display module 600 by the movement unit 400. The horizontal movement unit 420 may moves in the second direction D2 to align the separation knife 310 at a center portion of a long side of the display module 600. The vertical movement unit 430 may move in the third direction D3 to align the separation knife 310 at a position corresponding to between the first and second layers 670 and 680 of the display module 600, for example.

The separation knife 310 may have a quadrangular pyramid shape defined by a bottom surface (not shown) substantially vertical to the first direction D1 and a plurality of side surfaces extended in the first direction D1. The surfaces may include a lower surface 313 (refer to FIG. 7A) facing the upper surface of the stage 500, an upper surface 311 inclined to the lower surface 313 to face the lower surface 313, a first surface 312 connected between the lower surface 313 and the upper surface 311, and a second surface (not shown) connected between the lower surface 313 and the upper surface 311. The first surface 312 of the separation knife 310 may have a shape corresponding to the shape of the second surface. The upper surface 311 of the separation knife 310 may have a shape corresponding to the shape of the lower surface 313. For example, a height of the quadrangular pyramid shape may be larger than a width of the bottom surface. A width 312-W of the first surface 312 of the separation knife 310 may be smaller than a width 311-W of the upper surface 311 of the separation knife 310 at a position spaced apart from the bottom surface by a predetermined distance in the first direction D1. An angle between the lower surface 313 and the upper surface 311 may be in a range from about 1 degree to about 60 degrees, for example. The separation knife 310 may have a thickness of about 1 mm to about 1001 nm in the third direction D3. The shape of the separation knife 310 is not limited to the above-mentioned shape. An end portion of the separation knife 310 may be provided in a shape to be inserted in between the first layer 670 and the second layer 680, for example a corner shape or a vertex shape. When the lower surface 313 of the separation knife 310 is extended substantially in parallel to the upper surface of the stage 500 and a portion of the upper surface 311 of the separation knife 310 is inclined toward the lower surface of the separation knife 310, the separation knife 310 may have a wedge shape in which the upper surface 311 of the end portion of the separation knife 310 faces the first direction D1. The separation knife 310 having, for example, the above-mentioned shape may be inserted between the first layer 670 and the second layer 680 without causing damage to the display module 600.

The insertion movement unit 410 may move the separation knife 310 in the first direction D1, and the separation knife 310 may be inserted in between the first layer 670 and the second layer 680. The first layer 670 may be separated from the second layer 680 and a gap 675 may be formed between the first layer 670 and the second layer 680. Since the upper surface 311 of the separation knife 310 may be inclined toward the lower surface 313 of the separation knife 310, the thickness of the separation knife 310 may become gradually thicker from the end portion to the bottom surface. Therefore, as the separation knife 310 is inserted in between the first and second layers 670 and 680 along the first direction D1, the gap 675 may become larger to correspond to the thickness of the separation knife 310. For example, when the movement unit 400 moves the separation knife 310 in the third direction D3, the first layer 670 is more separated from the second layer 680. For example, in the case that the first layer 670 is not completely separated from the second layer 680, the separation knife 310 may move in the first and/or second directions D1 and D2, for example, after moving to the third direction D3, and the first and second layers 670 and 680 may be completely separated from each other.

A fixing part 550 may be disposed adjacent to an edge of the display module 600. The fixing part 550 may fix the display module 600 to the stage 500 to; for example, prevent the display module 600 from moving when the first and second layers 670 and 680 are separated from each other by the separation knife 310. For example, the fixing part 550 may be disposed adjacent to an opposite surface to the surface of the display module 600, into which the separation knife 310 is inserted, and may cover the opposite surface and a portion of the upper surface of the display module 600.

Figure 8:
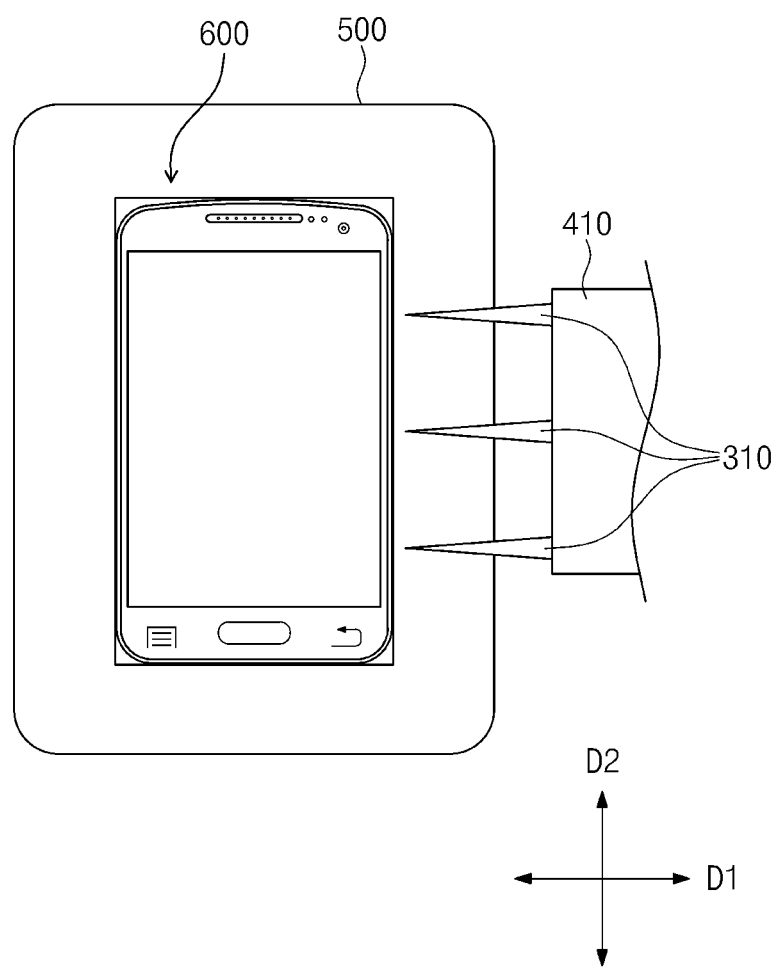
FIG. 8 is a plan view showing a separation knife according to an exemplary embodiment of the present invention.

FIG. 8 is a plan view showing a separation knife according to an exemplary embodiment of the present invention.

Referring to FIG. 8, the separation knife 310 may include three separation knives 310 and the separation knives 310 may be arranged in the second direction D2 and may be spaced apart from each other at regular intervals, but the number of the separation knives 310 is not limited to three. The separation knives 310 may be connected to the insertion movement unit 410. The separation knives 310 may move in the first direction D1 and may be inserted in between the first layer 670 and the second layer 680 of the display module 600.

Figure 9:
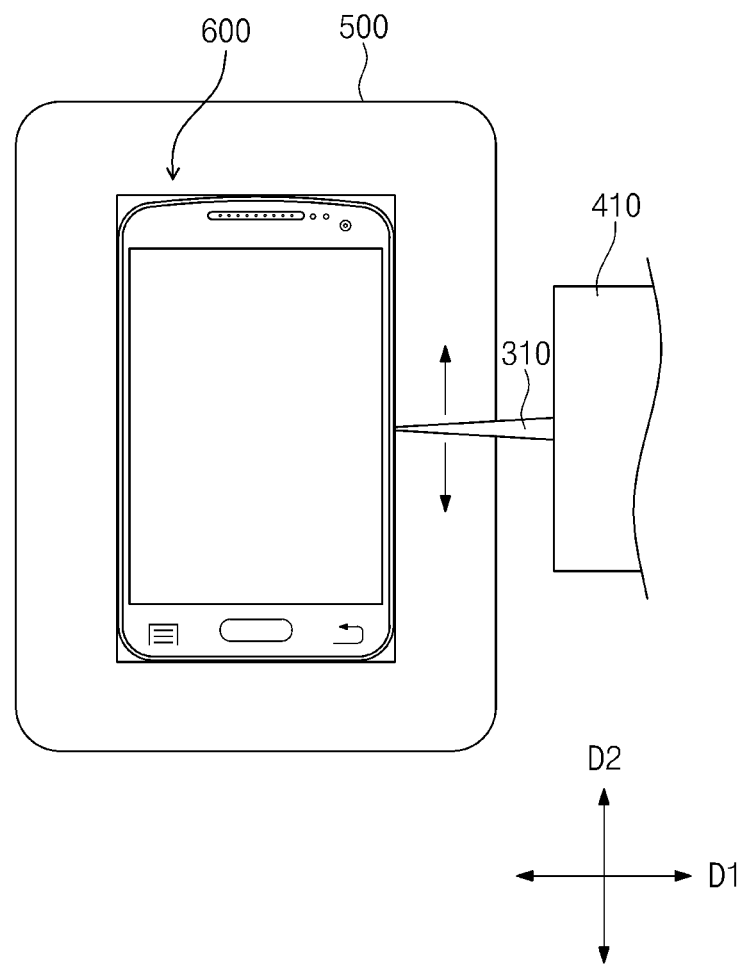
FIG. 9 is a plan view showing a separation knife according to an exemplary embodiment of the present invention.

FIG. 9 is a plan view showing a separation knife according to an exemplary embodiment of the present invention.

Referring to FIG. 9, the separation knife 310 may move in the second direction D2 after the separation knife 310 is inserted in between the first and second layers 670 and 680.

Thus, the separation knife 310 may move to an area between the first and second layers 670 and 680, into which the separation knife 310 is not inserted. The gap 675 may be formed between the first and second layers 670 and 680. Accordingly, the first and second layers 670 and 680 may be separated from each other.

Figure 10:
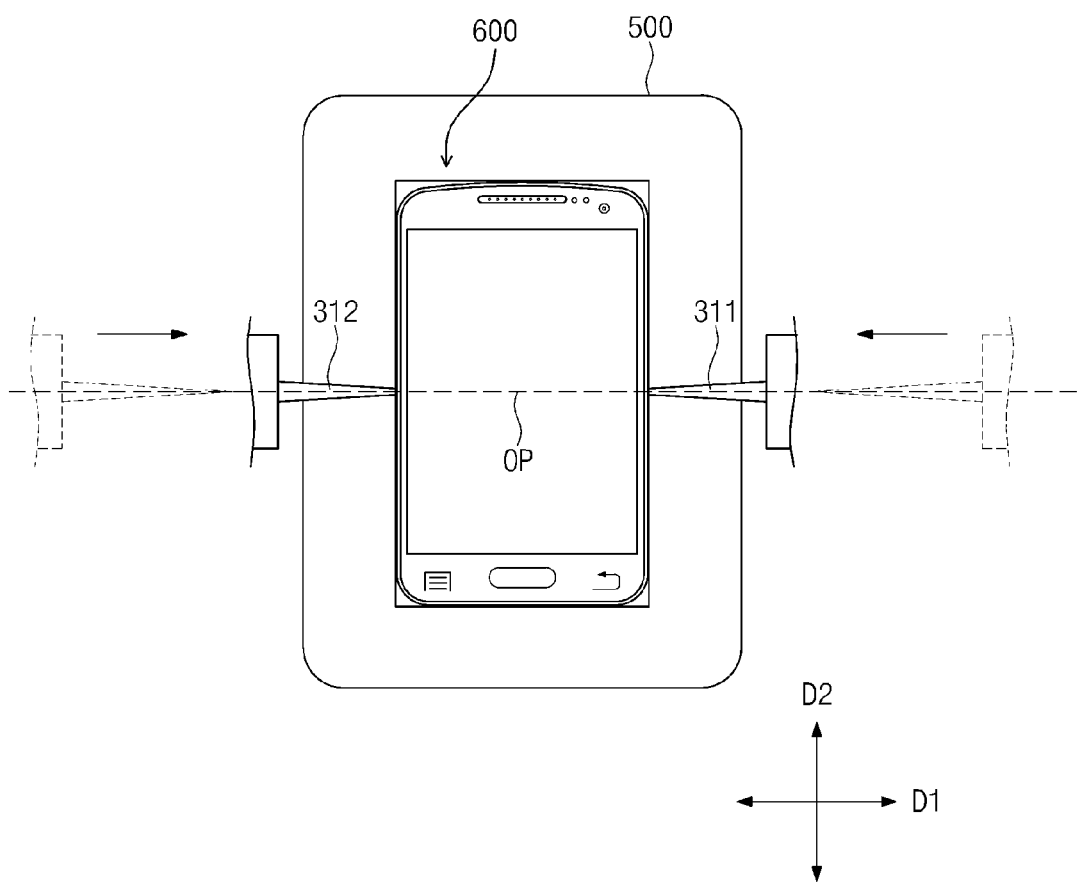
FIG. 10 is a plan view showing a separation knife according to an exemplary embodiment of the present invention.

FIG. 10 is a plan view showing a separation knife according to an exemplary embodiment of the present invention.

Referring to FIG. 10, the separation knife 310 may include a first separation knife part 311 and a second separation knife part 312. The first and second separation knife parts 311 and 312 may be aligned along an imaginary line OP that passes through a center portion of the stage 500 and is extended in the first direction D1. The first and second separation knives 311 and 312 may move along the imaginary line OP and may be substantially simultaneously inserted in between the first and second layers 670 and 680. The gap 675 may be formed at both sides of the display module 600, and thus the first and second layers 670 and 680 may be separated from each other. For example, since the first and second separation knife parts 311 and 312 are respectively inserted into both side portions of the display module 600, the gap 675 may be stably formed at both sides of the display module 600, thereby separating the first and second layers 670 and 680 from each other.

Figure 11:
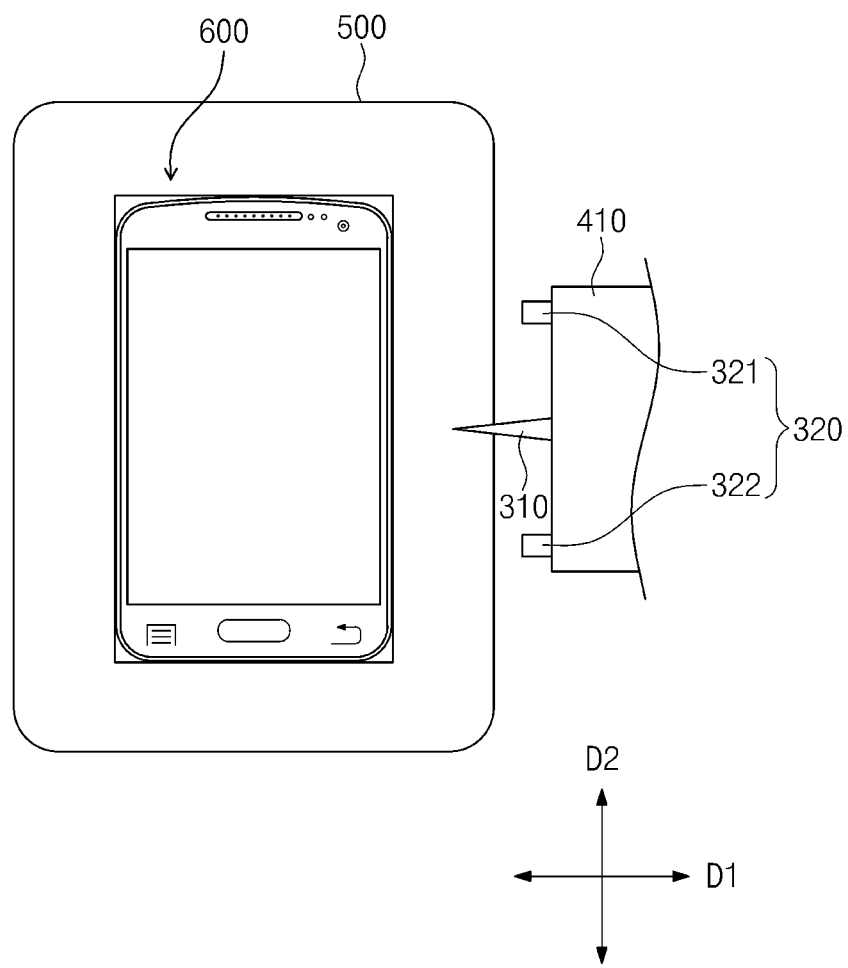
FIG. 11 is a plan view showing a separation frame according to an exemplary embodiment of the present invention.

FIG. 11 is a plan view showing a separation frame according to an exemplary embodiment of the present invention.

Referring to FIG. 11, the separation unit 300 may include a separation frame 320 extended substantially in parallel to the separation knife 310. The separation frame 320 may include a first separation frame part 321 and a second separation frame part 322. The first and second separation frame parts 321 and 322 may be disposed at opposite sides of the separation knife 310 and may be spaced apart from each other at regular intervals in the second direction D2 substantially perpendicular to the first direction D1. However, the number of the separation frame parts is not limited thereto or thereby. The separation frame 320 is configured to be inserted into the edge of the display module 600 and to stably support the second layer 680. The separation frame 320 may be connected to the insertion movement unit 410, and the separation frame 320 may move in the first direction D1. The separation knife 310 and/or the separation frame 320 may be partially recessed in the insertion movement unit 410 before the separation knife 310 and the separation frame 320 move to the first direction D1 by the insertion movement unit 410, and may be spaced far away from the display module 600.

Figure 12A:
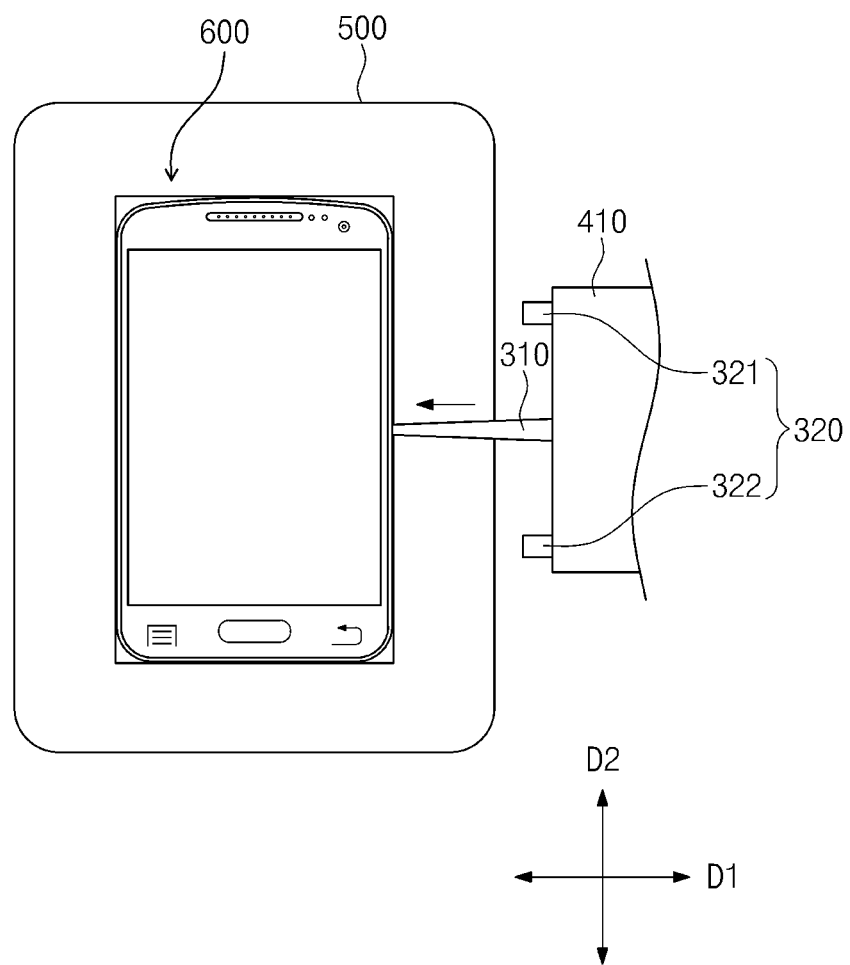
FIG. 12A is a plan view showing the separation knife shown in FIG. 11 inserted into the first and second layers according to an exemplary embodiment of the present invention.
Figure 12B:
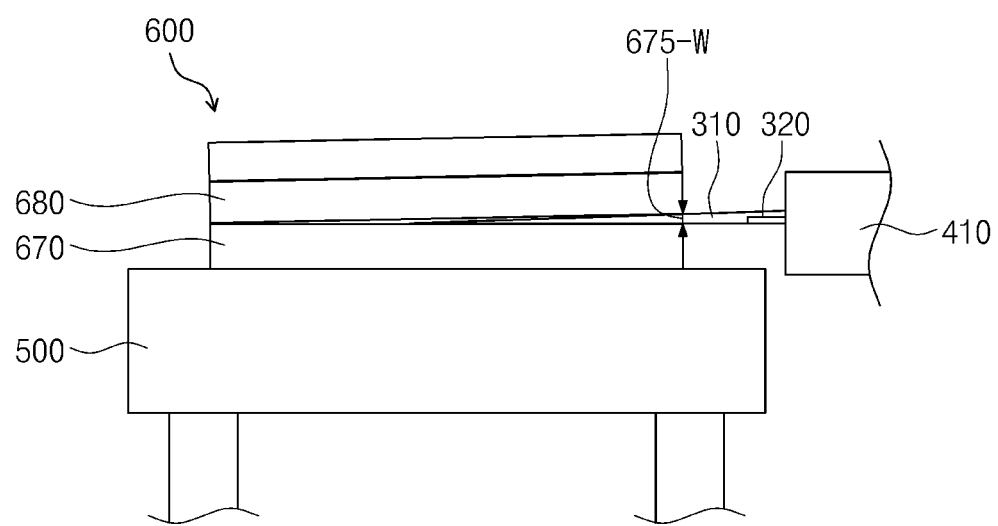
FIG. 12B is a side view showing the separation knife shown in FIG. 12A inserted into the first and second layers according to an exemplary embodiment of the present invention.

FIG. 12A is a plan view showing the separation knife shown in FIG. 11 inserted into the first and second layers and FIG. 12B is a side view showing the separation knife shown in FIG. 12A inserted into the first and second layers.

Referring to FIGS. 12A and 12B, the separation frame 320 may be disposed at an initial position and the separation knife 310 alone might move in the first direction D1 from its initial position to be inserted in between the first layer 670 and the second layer 680. For example, when the separation knife 310 arrives at a final position, the gap 675 may have a size 675-W corresponding to a thickest portion of the separation knife 310 inserted in between the first and second layers 670 and 680.

Figure 12C:
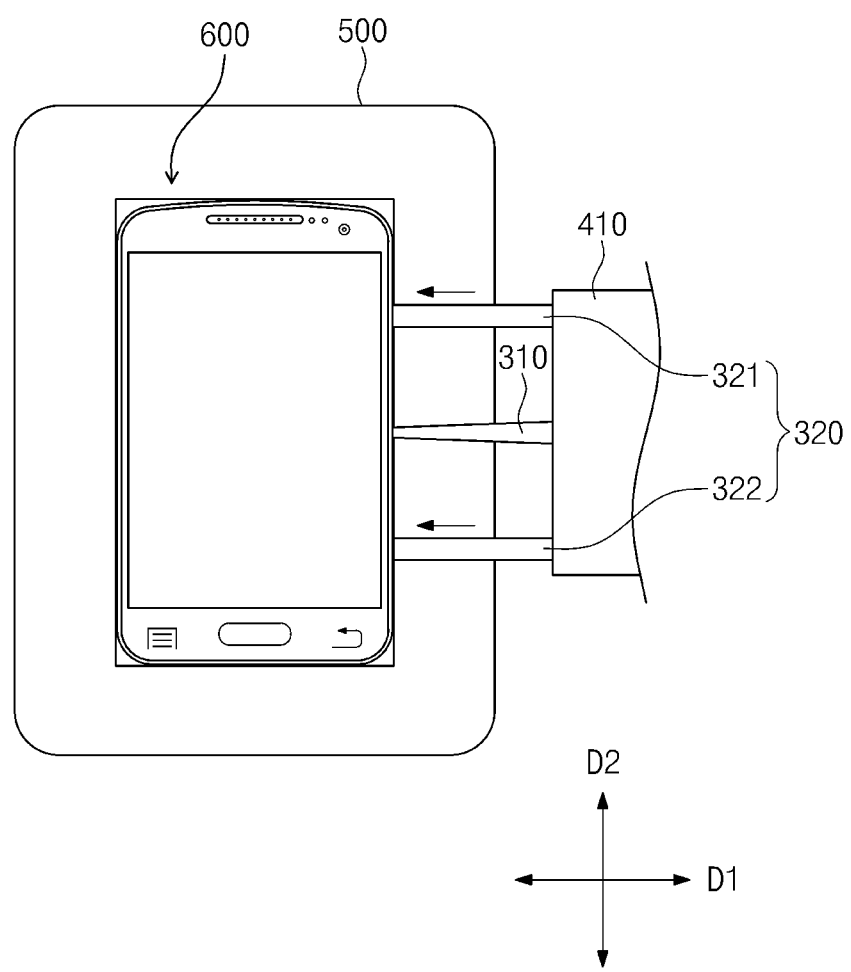
FIG. 12C is a plan view showing the separation frame shown in FIG. 11 inserted into the first and second layers according to an exemplary embodiment of the present invention.
Figure 12D:
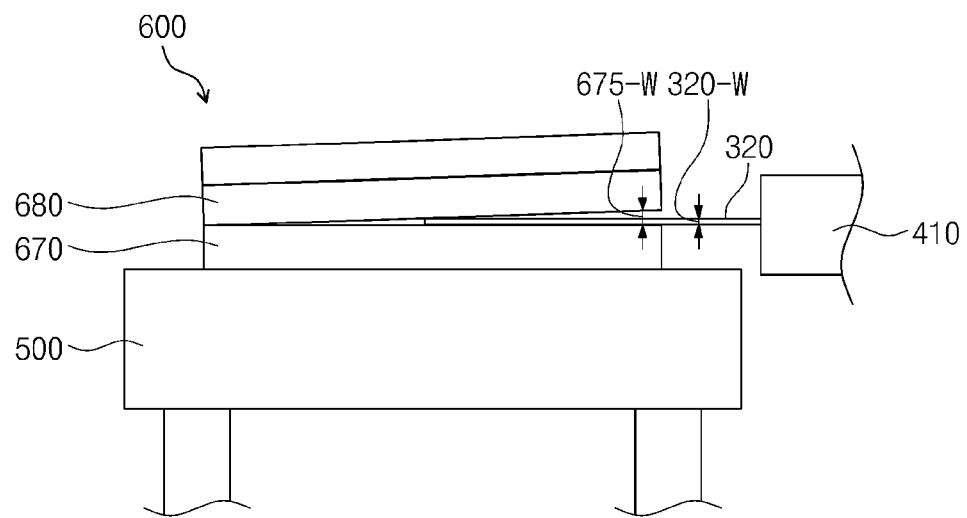
FIG. 12D is a side view showing the separation frame shown in FIG. 12C inserted into the first and second layers according to an exemplary embodiment of the present invention.

FIG. 12C is a plan view showing the separation frame shown in FIG. 11 inserted into the first and second layers and FIG. 12D is a side view showing the separation frame shown in FIG. 12C inserted into the first and second layers.

Referring to FIGS. 12C and 12D, the separation frame 320 may be inserted in between the first and second layers 670 and 680 through the gap 675, which may be formed between the first and second layers 670 and 680 by the separation knife 310, to support the second layer 680. The separation frame 320 may have a thickness 320-W. The thickness 320-W may be smaller than the size 675-W of the gap 675 such that the separation frame 320 may be inserted in between the first and second layers 670 and 680 without causing damage to the display module 600.

Figure 12E:
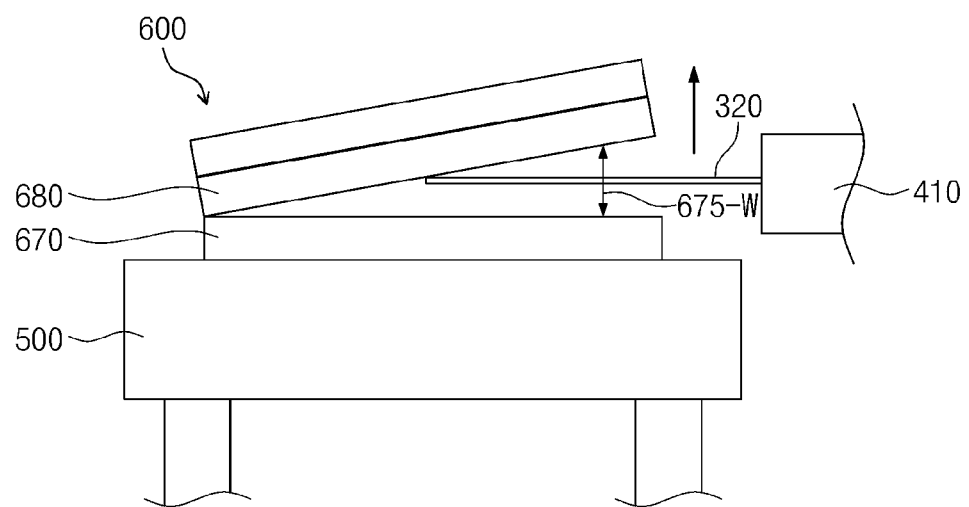
FIG. 12E is a side view showing a separating process of first and second layers by using the separation knife shown in FIG. 11 according to an exemplary embodiment of the present invention.

FIG. 12E is a side view showing a separating process of first and second layers by using the separation knife shown in FIG. 11.

Referring to FIG. 12E, the insertion movement unit 410 may move the separation frame 320 in the third direction D3 in order to separate the second layer 680 from the first layer 670. For example, when the separation knife 310 moves in the third direction to separate the second layer 680 from the first layer 670, the end portion of the separation knife 310 may be damaged since a relatively heavy weight may be applied to the end portion of the separation knife 310 that supports the second layer 680. According to an exemplary embodiment of the present invention, when the separation frame 320 supports the second layer 680 instead of the separation knife 310 the second layer 680 may be separated from the first layer 670 by the separation frame 320. As a result, the separation knife 310 may be prevented from being damaged.

While the present invention has been particularly shown and described with reference to exemplary embodiments thereof, it will be understood by those of ordinary skill in the art that various changes in form and detail may be made therein without departing from the spirit and scope of the present invention.

What is claimed is:

1. A display module reworking apparatus, comprising:
a chamber;
a temperature control unit, wherein the temperature control unit is configured to control a temperature in the chamber to reduce an adhesive property of an adhesive material of the display module, the adhesive material coupling a first layer of the display module to a second layer of the display module disposed on the first layer;
a stage disposed in the chamber, the stage configured to support the display module;
a separation unit disposed in the chamber, the separation unit configured to be inserted in between the first layer and the second layer, wherein the separation unit comprises a separation knife having a quadrangular pyramid shape and first and second separation frames disposed at opposite sides of the separation knife; and
a movement unit connected to the separation unit, the movement unit configured to move the separation unit inserted in between the first layer and the second layer to separate the second layer from the first layer,
wherein the adhesive material has a first adhesive force in a first temperature and a second adhesive force which is lower than the first adhesive force in a second temperature, and wherein the temperature control unit changes the temperature in the chamber from the first temperature to the second temperature.

2. The reworking apparatus of claim 1, wherein the temperature control unit maintains the temperature in the chamber to a desired temperature in a range of about −60° C. to about −40° C.

3. The reworking apparatus of claim 1, wherein the temperature control unit maintains the temperature in the chamber to a desired temperature in a range of about −40° C. to about 100° C.

4. The reworking apparatus of claim 1, wherein the separation knife comprises a bottom surface substantially vertical to a first direction into which the separation unit is inserted and a plurality of side surfaces extended in the first direction.

5. The reworking apparatus of claim 4, wherein the separation unit comprises a plurality of separation knives, and each of the plurality of separation knives arranged in a second direction substantially perpendicular to the first direction, and the plurality of separation knives are spaced apart from each other at regular intervals.

6. The reworking apparatus of claim 1, wherein the first and second separation frames extend substantially in parallel to the separation knife, the first and second separation frames configured to be inserted in between the first layer and the second layer through a gap and to support the second layer, the gap formed between the first layer and the second layer by the separation knife, and the movement unit is configured to move the first and second separation frames in a third direction substantially vertical to an upper surface of the stage to separate the second layer from the first layer.

7. The reworking apparatus of claim 6, wherein the separation frame has a thickness smaller than a thickness of the gap.

8. The reworking apparatus of claim 4, wherein the separation knife has a thickness in a range of about 1 mm to about 100 mm.

9. The reworking apparatus of claim 4, wherein an angle between an upper surface and a lower surface among the side surfaces of the separation knife is in a range of about 1 degree to about 60 degrees.

10. The reworking apparatus of claim 1, further comprising a fixing part disposed adjacent to the display module, the fixing part configured to secure the display module while the first and second layers are separated from each other.

11. The reworking apparatus of claim 1, wherein the first layer is a polarizing layer and the second layer is a cover window.

12. The reworking apparatus of claim 1, wherein the display module comprises a touch panel and a polarizing layer, wherein the touch panel and the polarizing layer are sequentially stacked, the first layer is an uppermost layer of the touch panel, and the second layer is the polarizing layer facing the first layer.

13. The reworking apparatus of claim 1, wherein the display module comprises a display panel and a touch panel, wherein the display panel and the touch panel are sequentially stacked, the first layer is an uppermost layer of the display panel, the first layer faces the touch panel, the second layer is a lowermost layer of the touch panel, and the second layer faces the uppermost layer of the display panel.

14. The reworking apparatus of claim 10, wherein the display module is a display module for an organic light emitting display or a display module for a liquid crystal display.

15. The reworking apparatus of claim 1, wherein the display module comprises a flexible display panel.

16. The reworking apparatus of claim 1, wherein the display module comprises a curved display panel containing at least one bend.

17. The reworking of claim 1, wherein the stage further comprises a vacuum absorbing pad, the vacuum absorbing pad configured to secure the display module.

18. A reworking method for a display module, comprising:
fixing a display module comprising a first layer and a second layer disposed on the first layer and coupled to the first layer, using an adhesive material, to a stage;
controlling a process temperature to decrease an adhesive property of the adhesive material;
inserting a separation unit in between the first layer and the second layer, wherein the separation unit comprises a separation knife having a quadrangular pyramid shape and first and second separation frames disposed at opposite sides of the separation knife; and moving the first and second separation frames after the separation knife is inserted in between the first layer and the second layer to separate the second layer from the first layer, wherein the adhesive material has a first adhesive force in a first temperature and a second adhesive force which is lower than the first adhesive force in a second temperature, and wherein a temperature control unit changes the temperature in the chamber from the first temperature to the second temperature.

19. The method of claim 18, wherein the process temperature is maintained at a predetermined temperature in a range from about −60° C. to about −40° C.

20. The method of claim 18, wherein the process temperature is maintained at a predetermined temperature in a range from about −40° C. to about 100° C.

21. The method of claim 18, wherein the separation of the second layer comprises moving the separation unit in a direction substantially vertical to an upper surface of the stage.

22. The method of claim 18, further comprising moving the separation unit in a direction substantially parallel to an upper surface of the stage after the inserting of the separation unit.

23. The method of claim 18, wherein the inserting of the separation unit further comprises aligning the first and second separation units on an imaginary line that passes through a center portion of the stage extended in a first direction, and the first and second separation units move along the imaginary line and are substantially simultaneously inserted in between the first layer and the second layer.

24. The method of claim 18, wherein the inserting of the separation unit comprises inserting the separation knife in between the first layer and the second layer and inserting the first and second separation frames in between the first layer and the second layer after the separation knife is inserted in between the first layer and the second layer, and the separation of the second layer from the first layer comprises moving the first and second separation frames inserted in between the first layer and the second layer in a direction substantially vertical to an upper surface of the stage.

25. The method of claim 24, wherein the first and second separation frames are configured to retract into the separation unit and out of the separation unit, the separation knife configured to retract into the separation unit and out of the separation unit, the inserting separation knife comprises retracting the separation knife out of the separation unit, and the inserting the separation frame comprises retracting the separation frame out of the separation unit.

26. The method of claim 24, wherein the inserting of the separation knife comprises forming a gap of which thickness is thicker than a thickness of the separation frame.

27. The method of claim 18, further comprising securing the display module while the first and second layers are separated from each other by a fixing part disposed adjacent to the display module.

28. The method of claim 18, wherein the fixing the display module comprising securing the display module with a absorbing pad disposed on the stage.

\* \* \* \* \*